(12) United States Patent
Himmetoglu et al.

(10) Patent No.: US 12,139,438 B2
(45) Date of Patent: Nov. 12, 2024

(54) FIRE RESISTANT COMPOSITIONS AND ARTICLES AND METHODS OF PREPARATION AND USE THEREOF

(71) Applicant: Eco Boron LLC, Tappan, NY (US)

(72) Inventors: Goksel Himmetoglu, Tappan, NY (US); Burhan Kum, Tappan, NY (US); Ozgur Oguz Susoy, Cankaya-Ankara (AR)

(73) Assignee: Eco Boron LLC, Tappan, NY (US)

( * ) Notice: Subject to any disclaimer, the term of this patent is extended or adjusted under 35 U.S.C. 154(b) by 0 days.

(21) Appl. No.: 17/616,892

(22) PCT Filed: Jun. 5, 2020

(86) PCT No.: PCT/US2020/036499
§ 371 (c)(1),
(2) Date: Dec. 6, 2021

(87) PCT Pub. No.: WO2020/247876
PCT Pub. Date: Dec. 10, 2020

(65) Prior Publication Data
US 2022/0306532 A1 Sep. 29, 2022

Related U.S. Application Data

(60) Provisional application No. 62/858,166, filed on Jun. 6, 2019.

(51) Int. Cl.
| | | |
|---|---|---|
| C04B 14/04 | (2006.01) | |
| C04B 14/10 | (2006.01) | |
| C04B 14/18 | (2006.01) | |
| C04B 14/28 | (2006.01) | |
| C04B 14/46 | (2006.01) | |
| C04B 18/24 | (2006.01) | |
| C04B 22/00 | (2006.01) | |
| C04B 22/06 | (2006.01) | |
| C04B 24/16 | (2006.01) | |
| C04B 28/04 | (2006.01) | |
| C04B 103/10 | (2006.01) | |
| C04B 103/63 | (2006.01) | |
| C04B 103/65 | (2006.01) | |
| C04B 111/00 | (2006.01) | |
| C04B 111/28 | (2006.01) | |
| C09K 21/02 | (2006.01) | |

(52) U.S. Cl.
CPC ........ *C04B 22/0013* (2013.01); *C04B 14/045* (2013.01); *C04B 14/106* (2013.01); *C04B 14/185* (2013.01); *C04B 14/28* (2013.01); *C04B 14/4668* (2013.01); *C04B 18/24* (2013.01); *C04B 22/064* (2013.01); *C04B 24/16* (2013.01); *C04B 28/04* (2013.01); *C09K 21/02* (2013.01); *C04B 2103/10* (2013.01); *C04B 2103/63* (2013.01); *C04B 2103/65* (2013.01); *C04B 2111/00172* (2013.01); *C04B 2111/28* (2013.01)

(58) Field of Classification Search
CPC .............. C04B 22/0013; C04B 14/045; C04B 14/106; C04B 14/185; C04B 14/28; C04B 14/4668; C04B 18/24; C04B 22/064; C04B 24/16; C04B 28/04; C04B 2103/10; C04B 2103/63; C04B 2111/00172; C04B 2111/28; C04B 20/10; C04B 2111/00431; C04B 2111/00982; C04B 28/10; C04B 28/14; C04B 28/146; C04B 28/26; C04B 2111/27; C09K 21/02; H01B 7/295; Y02W 30/91

See application file for complete search history.

(56) References Cited

U.S. PATENT DOCUMENTS

| | | | |
|---|---|---|---|
| 2,956,893 | A | 10/1960 | Houston et al. |
| 4,387,176 | A | 6/1983 | Frye |
| 4,405,682 | A | 9/1983 | Fujita et al. |
| 4,486,553 | A | 12/1984 | Wesch |
| 4,992,481 | A | 2/1991 | von Bonin et al. |
| 5,017,637 | A | 5/1991 | Smith et al. |
| 5,156,775 | A | 10/1992 | Blount |
| 5,180,767 | A | 1/1993 | Sakai et al. |
| 5,389,716 | A | 2/1995 | Graves |
| 5,401,793 | A | 3/1995 | Kobayashi et al. |
| 5,837,621 | A | 11/1998 | Kajander |
| 6,319,312 | B1 | 11/2001 | Luongo |
| 6,517,748 | B2 | 2/2003 | Richards et al. |
| 6,620,349 | B1 | 9/2003 | Lopez |
| 6,783,799 | B1 | 8/2004 | Goodson |
| 7,211,293 | B2 | 5/2007 | Piana et al. |
| 8,388,807 | B2 | 3/2013 | Sealey et al. |
| 2005/0249934 | A1 | 11/2005 | Hume |
| 2017/0130066 | A1 | 5/2017 | Lang et al. |
| 2017/0145223 | A1 | 5/2017 | Lang et al. |
| 2018/0037504 | A1* | 2/2018 | Zubrod ............... C04B 22/0013 |

FOREIGN PATENT DOCUMENTS

| | | | |
|---|---|---|---|
| CN | 104386959 A | * | 3/2015 |
| CN | 105632592 A | * | 6/2016 |
| CN | 106280777 A | * | 1/2017 |
| CN | 107382257 A | * | 11/2017 |
| CN | 107674514 A | * | 2/2018 |
| CN | 107879710 A | * | 4/2018 |
| CN | 107188516 A | | 1/2019 |

(Continued)

OTHER PUBLICATIONS

International Search Report for PCT Patent Application No. PCT/US2020/036499 Issued on Sep. 3, 2020 3 pages.

*Primary Examiner* — Anthony J Green
(74) *Attorney, Agent, or Firm* — Lowenstein Sandler LLP

(57) ABSTRACT

Disclosed herein are fire resistant compositions and articles, for example, in the form of boards, insulation, sheeting, blocks, panels and similar materials of construction. Also disclosed are methods of preparing fire resistant compositions and articles and methods of use thereof.

21 Claims, No Drawings

(56) References Cited

FOREIGN PATENT DOCUMENTS

| | | | |
|---|---|---|---|
| CN | 101892057 | B | 3/2019 |
| CN | 107266008 | A | 3/2019 |
| CN | 101056942 | B | 4/2019 |
| CN | 107500694 | | 4/2019 |
| CN | 107572947 | A | 4/2019 |
| CN | 108059422 | A | 4/2019 |
| CN | 108101470 | A | 4/2019 |
| CN | 108101471 | A | 4/2019 |
| CN | 108623272 | A | 4/2019 |
| EP | 0033391 | B1 | 4/2019 |
| JP | 2839149 | B2 | 4/2019 |
| KR | 101729384 | B1 | 4/2019 |
| RU | 1804082 | C * | 8/1995 |
| RU | 2523818 | C1 | 6/2012 |
| RU | 2000125023 | A | 3/2019 |

* cited by examiner

FIRE RESISTANT COMPOSITIONS AND ARTICLES AND METHODS OF PREPARATION AND USE THEREOF

CROSS-REFERENCE TO RELATED APPLICATION(S)

This application claims priority to Provisional U.S. Application No. 62/858,166 filed Jun. 6, 2019, the contents of which are incorporated by reference herein in their entirety.

FIELD

Described herein are fire resistant compositions and articles, for example, in the form of boards, insulation, sheeting, panels, blocks and other building components. Also disclosed are methods of preparing fire resistant compositions and articles and methods of use thereof.

BACKGROUND

Fire-resistant materials are important in the fabrication of building materials such as boards, doors, insulation components, wall components (e.g., sheeting, panels), foundation components (e.g., blocks), ceiling components, roof components, etc. In general, the ignition temperature of wood is about 260° C., the melting point of aluminum is 660° C., and the temperature at which a plasterboard releases its crystal water is between 100° C. and 150° C. Although steel frames for buildings have a melting point exceeding 1500° C., it is believed that their strength is suddenly reduced at around 600° C. to cause buckling. In the event of a fire, fire resistant building materials protect the integrity of the building and its infrastructure at higher temperatures than traditional building materials and for longer periods. Fire resistant building materials provide more time for occupants to escape and for firefighters to access strategic points to rescue people and fight the fire. Such materials also help reduce damage to the infrastructure and contents of buildings and can reduce or prevent noxious fumes from escaping into the environment.

A variety of compositions and methods have been proposed for producing fire-resistant materials. However, there remains a need for improved, eco-friendly fire-resistant compositions and articles and methods of preparation and use thereof.

BRIEF SUMMARY

According to embodiments, disclosed herein are fire resistant compositions comprising an additive, a filler, a fire resistant material and optionally a binder. In embodiments, the fire resistant composition comprises a dry mixture of a binder comprising at least one of Portland cement or lime; the additive comprising at least one of perlite or meta kaolin; the filler comprising at least one of wollastonite, basalt fiber or sodium alpha olefin sulfonate; and the fire resistant material comprising zinc borate. In embodiments, the perlite comprises modified expanded perlite in an amount of about 20 wt % to about 30 wt % of the total composition, wherein the Portland cement is in an amount of about 25 wt % to about 45 wt % of the total composition, the lime is in an amount of about 10 wt % to about 20 wt % of the total composition, the wollastonite is in an amount of about 1 wt % to about 15 wt % of the total composition, the meta kaolin is in an amount of about 1 wt % to about 5 wt % of the total composition, the basalt fiber is in an amount of about 0.1 wt % to about 1.0 wt % of the total composition, the sodium alpha olefin sulfonate is in an amount of about 0.1 wt % to about 1 wt % of the total composition and the zinc borate is in an amount of about 1 wt % to about 10 wt % of the total composition. According to yet further embodiments, the additive may comprise at least one of perlite, a concrete waterproofing additive or sodium silicate, the filler comprises wollastonite, and the fire resistant material comprises zinc borate, the composition further comprising water. In embodiments, the perlite comprises modified expanded perlite in an amount of about 20 wt % to about 30 wt % of the total composition and modified expanded perlite powder in an amount of about 0.5 wt % to about 5.0 wt % of the total composition, wherein the wollastonite is in an amount of about 1 wt % to about 7 wt % of the total composition, the concrete waterproofing additive is in an amount of about 0.1 wt % to about 5.0 wt % of the total composition, the sodium silicate is in an amount of about 18 wt % to about 30 wt % of the total composition, the zinc borate is in an amount of about 1 wt % to about 10 wt % of the total composition and the water is in an amount of about 35 wt % to about 50 wt % of the total composition.

Further disclosed herein is a fire resistant article, comprising: an additive; a filler; and a fire resistant material. In embodiments, the fire resistant article may comprise a mixture of a binder comprising at least one of Portland cement or lime; the additive comprising at least one of perlite or meta kaolin; the filler comprising at least one of wollastonite, basalt fiber or sodium alpha olefin sulfonate; and the fire resistant material comprising zinc borate. In embodiments, the perlite comprises modified expanded perlite in an amount of about 20 wt % to about 30 wt % of the total composition, wherein the Portland cement is in an amount of about 25 wt % to about 45 wt % of the total composition, the lime is in an amount of about 10 wt % to about 20 wt % of the total composition, the wollastonite is in an amount of about 1 wt % to about 15 wt % of the total composition, the meta kaolin is in an amount of about 1 wt % to about 5 wt % of the total composition, the basalt fiber is in an amount of about 0.1 wt % to about 1.0 wt % of the total composition, the sodium alpha olefin sulfonate is in an amount of about 0.1 wt % to about 1 wt % of the total composition and the zinc borate is in an amount of about 1 wt % to about 10 wt % of the total composition. According to yet further embodiments, the additive may comprise at least one of perlite, a concrete waterproofing additive or sodium silicate, the filler comprises wollastonite, and the fire resistant material comprises zinc borate, the composition further comprising water. In embodiments, the perlite comprises modified expanded perlite in an amount of about 20 wt % to about 30 wt % of the total composition and modified expanded perlite powder in an amount of about 0.5 wt % to about 5.0 wt % of the total composition, wherein the wollastonite is in an amount of about 1 wt % to about 7 wt % of the total composition, the concrete waterproofing additive is in an amount of about 0.1 wt % to about 5.0 wt % of the total composition, the sodium silicate is in an amount of about 18 wt % to about 30 wt % of the total composition, the zinc borate is in an amount of about 1 wt % to about 10 wt % of the total composition and the water is in an amount of about 35 wt % to about 50 wt % of the total composition.

In yet further embodiments, disclosed herein is a method of preparing a fire resistant composition, comprising: combining an additive, a filler and a fire resistant material to form a mixture of dry material.

Further disclosed are methods of using the fire resistant composition according to embodiments herein comprising coating a building material, an industrial oven or an electrical component with the fire resistant material.

According to further embodiments, disclosed herein are methods of using a fire resistant article according to embodiments herein comprising installing the fire resistant article in at least one of a building, airplane or space craft.

In embodiments, disclosed herein is a fire resistant composition, comprising: a binder comprising at least one of Portland cement or lime; an additive comprising at least one of perlite or meta kaolin; a filler comprising at least one of wollastonite, basalt fiber or sodium alpha olefin sulfonate; and a fire resistant material comprising zinc borate. In embodiments, at least one of: the Portland cement is in an amount of about 25 wt % to about 45 wt % of the total composition, the lime is in an amount of about 10 wt % to about 20 wt % of the total composition, the perlite comprises modified expanded perlite in an amount of about 20 wt % to about 30 wt % of the total composition, the meta kaolin is in an amount of about 1 wt % to about 5 wt % of the total composition, the wollastonite is in an amount of about 1 wt % to about 15 wt % of the total composition, the basalt fiber is in an amount of about 0.1 wt % to about 1.0 wt % of the total composition, the sodium alpha olefin sulfonate is in an amount of about 0.1 wt % to about 1 wt % of the total composition, and the zinc borate is in an amount of about 1 wt % to about 10 wt % of the total composition.

In yet further embodiments, disclosed herein is a fire resistant composition, comprising: an additive comprising at least one of perlite, a concrete waterproofing additive or sodium silicate; a filler comprising wollastonite; a fire resistant material comprising zinc borate; and water. In embodiments, at least one of: the perlite comprises modified expanded perlite in an amount of about 20 wt % to about 30 wt % of the total composition and modified expanded perlite powder in an amount of about 0.5 wt % to about 5.0 wt % of the total composition, the concrete waterproofing additive is in an amount of about 0.1 wt % to about 5.0 wt % of the total composition, the sodium silicate is in an amount of about 18 wt % to about 30 wt % of the total composition, the wollastonite is in an amount of about 1 wt % to about 7 wt % of the total composition, the zinc borate is in an amount of about 1 wt % to about 10 wt % of the total composition, or the water is in an amount of about 35 wt % to about 50 wt % of the total composition.

According to embodiments, also disclosed herein is a fire resistant composition comprising a homogenous dry mixture of an additive comprising at least one of perlite, a polymer, a silicone and an accelerator, a filler comprising at least one of polypropylene fiber and basalt microfiber, or a fire resistant material comprising boron oxide.

Further described in embodiments herein are fire resistant articles, comprising an additive, a filler and a fire resistant material.

According to further embodiments, disclosed herein are methods of preparing a fire resistant composition, comprising combining an additive, a filler and a fire resistant material to form a combination.

In yet further embodiments, disclosed herein are methods of using fire resistant articles as described herein comprising installing the fire resistant article in a building, airplane, spacecraft, or coating a building material, an industrial oven or an electrical component.

DETAILED DESCRIPTION

Described herein are various embodiments of fire resistant compositions and articles and methods of preparation and use thereof. It is to be understood that the invention is not limited to the details of construction or process steps set forth in the following description. The invention is capable of other embodiments and of being practiced or being carried out in a variety of ways.

Reference throughout this specification to "one embodiment," "certain embodiments," "one or more embodiments," "an embodiment," "at least one embodiment" and "embodiments" (or similar terms) means that a particular feature, structure, material, or characteristic described in connection with the embodiment is included in at least one embodiment of the invention. Thus, the appearances of the phrases such as "in one or more embodiments," "in certain embodiments," "in one embodiment," "in an embodiment," "at least one embodiment" and "embodiments" (or similar terms) in various places throughout this specification are not necessarily referring to the same embodiment of the invention. Furthermore, the particular features, structures, materials, or characteristics may be combined in any suitable manner in one or more embodiments.

As used herein, the singular forms "a," "an," and "the" include plural references unless the context clearly indicates otherwise. Thus, for example, reference to "a catalyst material" includes a single catalyst material as well as a mixture of two or more different catalyst materials.

As used herein, the term "about" in connection with a measured quantity, refers to the normal variations in that measured quantity as expected by one of ordinary skill in the art in making the measurement and exercising a level of care commensurate with the objective of measurement and the precision of the measuring equipment. In certain embodiments, the term "about" includes the recited number ±10%, such that "about 10" would include from 9 to 11.

The term "at least about" in connection with a measured quantity refers to the normal variations in the measured quantity, as expected by one of ordinary skill in the art in making the measurement and exercising a level of care commensurate with the objective of measurement and precisions of the measuring equipment and any quantities higher than that. In certain embodiments, the term "at least about" includes the recited number minus 10% and any quantity that is higher such that "at least about 10" would include 9 and anything greater than 9. This term can also be expressed as "about 10 or more." Similarly, the term "less than about" typically includes the recited number plus 10% and any quantity that is lower such that "less than about 10" would include 11 and anything less than 11. This term can also be expressed as "about 10 or less."

Unless otherwise indicated, all parts and percentages are by weight. Weight percent (wt. %), if not otherwise indicated, is based on an entire composition free of any volatiles, that is, based on total dry solids content of the composition.

The term "fire resistant" refers to the maximum temperature that a material can endure without burning through or collapsing (losing its integrity) or the time it takes at a certain high temperatures to burn through, collapse or otherwise destroy the integrity of a component. Codes and standards have been established for many products, which set forth the high temperature performance they must meet to be considered fire rated or fire-resistant. The term "fire retardant" refers to the ability of a material or component to withstand high temperature and time without catching on fire and burning.

Although the disclosure herein is with reference to particular embodiments, it is to be understood that these embodiments are merely illustrative of the principles and applications of the invention. It will be apparent to those skilled in the art that various modifications and variations can be made to the compositions and methods without departing from the spirit and scope of the invention. Thus, it is intended that the invention include modifications and variations that are within the scope of the appended claims and their equivalents.

Fire Resistant Compositions and Articles

Disclosed herein are fire resistant compositions and fire resistant articles formed from fire resistant compositions. In embodiments, such compositions and articles may be fire retardant. According to embodiments, fire resistant compositions can include an additive, a filler and a fire resistant material.

The additive can include, but is not limited to, a pozzolanic compound, perlite, vermiculite, diatomite, smectite, illite, dickite, nacrite, hectorite, montmorillonite, bentonite, glauconite, clay, kaolin (e.g., meta kaolin), shale, slag, fly ash, silica fume (e.g., Aerosil® 200 hydrophilic fumed silica), pumice (e.g., expended, modified, etc. to add extra weight and/or extra strength), calcium carbonate, calcium hydroxide, a cellulosic material, a polymer, a stearate compound such as zinc stearate, a waterproofing material and an accelerator. Those ordinary skill in the art will recognize that certain additive materials may also be suitable fire resistant or fire retardant materials. For example, a fire resistant material in a small amount (e.g., ≤7.0 wt %, or ≤4.0 wt %, or ≤0.1 wt %, or ≤0.05 wt %, or ≤0.01 wt %)) may be suitable as an additive, but in a comparatively larger amount (≥0.1 wt %) may be a suitable fire resistant material. Additionally or alternatively, an additive material that is resistant to burning or flaming at fire rated temperatures, for example, an ignition temperature of about 400° F. or higher or a flash point of about 200° F. or higher, may also be suitable as a fire resistant material. In embodiments, the fire resistant composition contains meta kaolin, which is a fire resistant, calcined clay that binds well with perlite. Meta kaolin is finer than cement, which also promotes binding and stability (i.e., fills the spaces in between different size spheres). In embodiments, the additive may be present in an amount of about 20 wt % to about 99 wt %, or about 25 wt % to about 95 wt %, or about 35 wt % to about 90 wt %, or about 40 wt % to about 85 wt %, or about 45 wt % to about 80 wt %, or about 29 wt %, or about 30 wt %, or about 31 wt %, or about 45 wt %, or about 46 wt %, or about 47 wt % of the total weight of the fire resistant composition.

According to embodiments, the additive includes perlite, a polymer and an accelerator. The perlite additive can be a powder having a particle size distribution of less than about 5 mm, or less than about 4 mm, or less than about 3 mm, or less than about 2 mm, or less than about 1 mm, or less than about 200 μm, or less than about 180 μm, or less than about 160 μm, or less than about 150 μm, or less than about 140 or less than about 120 μm. In embodiments, the perlite can be in the form of a silica aerogel modified perlite that is vacuum filled inside the perlite, which adds to hardness and hyrophobia values of the perlite. The perlite may be in the form of a spray and mix coated perlite, which reduces or eliminates perlite's hydrophilic properties that cause binding and stability issues. The spray and mix coated perlite can make the perlite harder, which helps protect against bruising and crushing of the perlite during mixing; bruising and crushing changes the physical properties of the perlite resulting in the loss of its high temp resistant properties. In embodiments, the perlite may be a spray and mixt coated perlite powder, which can improve the binding of perlite spheres by filling in empty space. In embodiments, the perlite may be a modified expanded perlite or a modified expanded perlite powder. Modified expanded perlite is fire resistant, expended perlite having the structure of little air spheres protects against heat bridging, heat insulation, sound insulation and perlite is light weighing 60 percent less than concrete. Modified (coated) expanded perlite may be introduced to heat as it expands, for example, like popcorn (creates small air bubbles inside) and has a mean particle size of about 3 mm or a particle size of less than 3 mm. Modified expanded perlite powder has a mean particle size of about 0 μm to 5 μm or a particle size of less than 5 μm; in embodiments, the powder may be coated to render it waterproof.

In embodiments, the fire resistant material comprises modified expanded perlite in an amount of about 1 wt % to about 50 wt %, or about 5 wt % to about 45 wt %, or about 10 wt % to about 40 wt %, or about 15 wt % to about 35 wt %, or about 20 wt % to about 30 wt %, or about 21 wt %, 22 wt %, 23 wt %, 24 wt %, 25 wt %, 26 wt % or 27 wt %. In embodiments the fire resistant material comprises modified expanded perlite powder in an amount of about 0.1 wt % to about 10 wt %, or about 0.5 wt % to about 5 wt %, or about 0.75 wt % to about 2.5 wt %, or about 0.9 wt %, about 1.0 wt %, about 1.25 wt %, about 1.5 wt %, about 1.75 wt %, or about 2.0 wt %.

The polymer can include, but is not limited to, a silicone, a silicone hydrophobic powder (e.g., Canadian), acrylic, styrene-acrylic, styrene-acrylic vinyl acetate, polyvinyl acetate, ethylene-vinyl acetate, co-polymers thereof, dispersions thereof and admixtures thereof. According to embodiments, the polymer includes a silicone hydrophobic powder.

According to embodiments, the additive includes an accelerator. The accelerator can include, but is not limited to, calcium chloride, calcium nitrate, calcium sulfate, sodium chloride, sodium silicate (e.g., 3.2 module to help with binding and hardness), sodium metasilicate, anhydrous sodium metasilicate and a high performance accelerator for dry-mix sprayed concrete. According to embodiments, the accelerator can have a pouring density of about 0.1 kg/L to about 5 kg/L, or about 0.2 kg/L to about 2 kg/L, or about 0.5 kg/L to about 1 kg/L, or about 0.8 kg/L, or about 0.9 kg/L, or about 1 kg/L, or about 2 kg/L, a pH value of about 9 to about 13, or about 10 to about 12, or about 11 and a chloride content of less than about 0.5%, or less than about 0.2%, or less than about 0.1%, or less than about 0.05%. In embodiments, the accelerator can be MasterRoc® SA 580 manufactured by BASF®. The accelerator can be in liquid form, while the remainder of the fire resistant composition is a dry powder mixture. In certain embodiments, the accelerator includes sodium silicate, sodium metasilicate and a high performance accelerator for dry-mix sprayed concrete all of which are in liquid form. The accelerator components may or may not be pre-mixed before combining with dry components of the fire resistant composition. In embodiments, the fire resistant composition comprises sodium silicate 3.2 (liquid). The sodium silicate may be fire resistant and can help with hardening the material and stability during curing process. As the material hardens faster, initially during curing time, the sodium silicate 3.2 helps protect against cracks as water evaporates.

Suitable waterproofing materials include, but are not limited to, zinc formate, sodium alpha olefin sulfonate and one or more concrete waterproofing additive (e.g., Xypex® Admix), for example, fine silica, polymers, densifiers (e.g., silica-based compounds that react with lime), water repellants (e.g., silicone resins), a pozzolanic material modified with at least one hydrophobic material, wherein the pozzolanic material comprises one or more of silica fume (e.g., densified silica fume), microsilica (e.g., refined natural microsilica) and meta kaolin, and wherein the hydrophobic material is a metallic or organic soap of a paraffinic acid, calcium stearate, an ester of a paraffinic acid, butyl stearate, oleic acid, a wax emulsion, siloxane, a silicon emulsion. The concrete waterproofing additive can assist with binding, increase hydrophobic properties and increase stability. Those of ordinary skill in the art will recognize that certain additives, fillers and fire resistant materials as described herein may also be suitable waterproofing materials. In embodiments, the waterproofing material may be present in an amount of about 0.1 wt % to about 10 wt %, or about 0.1 wt % to about 5.0 wt %, or about 0.5 wt % to about 2.5 wt %, or about 1.0 wt % to about 2.0 wt % of the total weight of the fire resistant composition. In embodiments, the sodium alpha olefin sulfonate makes the fire resistant material hydrophobic once it cures and making the material waterproof helps with stability and protects against mold.

In certain embodiments, the additive may include calcium carbonate. The calcium carbonate may be in the form of a powder having a particle size distribution of less than about 500 μm, or less than about 400 μm, or less than about 300 or less than about 200 μm, or less than about 100 μm.

In embodiments, the additive includes a cellulosic material. The cellulosic material can include, but is not limited to, a starch ether, pectin, cellulose, lignin, hemicellulose, plant fiber, wood fiber, cotton fiber and hemp fiber (e.g., including, but not limited to, bast fibers, hemp hurdle fine, hemp paper, etc.). Suitable starch ethers include, but are not limited to, potato starch ether and Casucol®, Opagel®, Addilose®, Solvitose®, Foxcrete® and Colle® modified starch ether products. According to embodiments, the additive can be a potato starch derivative, for example, Empresol NE 60, and may have a synergistic effect when in combination with cellulose derivatives to create a stronger material.

In at least one embodiment, the additive includes a surfactant. The surfactant can include, but is not limited to, an alpha olefin sulfonate, alkylbenzene sulfonate, dodecyl benzene sulfonate, polyvinyl alcohol, polyethylene glycol, hydrocarbon oil, polydimethylsiloxane, fatty alcohol ethoxylate, fatty acid ester, co-polymer of propylene oxide and ethylene oxide, styrene-butadiene resin, salts thereof and derivatives thereof. In embodiments, the co-polymer of propylene oxide and ethylene oxide comprises about 50%, about 60%, about 70%, about 75%, about 80%, about 85%, or about 90% ethylene oxide. In certain embodiments, the surfactant can include, but is not limited to, at least one of an alpha olefin sodium salt or a co-polymer of propylene oxide and ethylene oxide. The surfactant can be in an amount of about 0.1 wt % to about 5 wt %, or about 0.5 wt % to about 2.5 wt %, or about 1.0 wt % to about 2.0 wt %, or about 1.5 wt %, or about 1.6 wt %, or about 1.7 wt %, or about 1.8 wt %, or about 1.9 wt % of the total weight (e.g., the dry weight) of the fire resistant composition. According to embodiments, the surfactant can be a nonionic emulsifier for emulsion polymerization that is free of alkylphenol ethoxylates, such as Genapol PF 80 sold by Clariant®.

According to embodiments, the fire resistant composition contains a filler. The filler can include, but is not limited to, ceramic, silica (e.g., colloidal silica to assist with binding and stabilization), glass (e.g., glass fiber, recycled glass spheres, etc.), marble (e.g., recycled marble powder), polypropylene fiber, basalt microfiber, titanium dioxide, potassium titanate, zinc oxide, zinc sulfite, antimony oxide, iron oxide, iron phosphate, fiberglass, mica, talc, aluminum trihydrate, antimony trioxide, zinc borate, a stearate component such as zinc stearate, wollastonite (e.g., Kemolit® kw 60 by Wolkem) and dolomite. Those ordinary skill in the art will recognize that certain filler materials may also be suitable fire resistant or fire retardant materials. For example, a fire resistant material in a small amount (e.g., ≤0.1 wt %, or ≤0.05 wt %, or ≤0.01 wt %)) may be suitable as a filler, but in a comparatively larger amount (≥0.1 wt %) may be a suitable fire resistant material. Additionally or alternatively, a filler material that is resistant to burning or flaming at fire rated temperatures, for example, an ignition temperature of about 400° F. or higher or a flash point of about 200° F. or higher, may also be suitable as a fire resistant material. In embodiments, the filler includes at least one of polypropylene fiber or basalt microfiber. Basalt microfiber is an organic fiber that helps bind and is also high temperature resistant. The fibers can have a length of less than about 2 cm, or less than about 1.5 cm, or less than about 1.0 cm, or less than about 0.5 cm and a diameter of about 0.01 mm to about 0.2 mm, or about 0.02 mm to about 0.1 mm, or about 0.05 mm to about 0.075 mm. In embodiments, the filler is in an amount of about 0.01 wt % to about 15.0 wt %, or about 0.05 wt % to about 14.0 wt %, or about 0.1 wt % to about 13.0 wt %, or about 10 wt %, about 11 wt %, about 12 wt % about 13 wt %, or about 14 wt % of the total weight of the fire resistant composition. In embodiments, the filler can be in an amount of about 0.01 wt % to about 0.5 wt %, or about 0.05 wt % to about 0.4 wt %, or about 0.1 wt % to about 0.35 wt %, or about 0.27 wt %, or about 0.28 wt %, or about 0.29 wt %, or about 0.30 wt %, or about 0.31 wt %, or about 0.32 wt %, or about 0.33 wt %, or about 0.34 wt %, or about 0.35 wt % of the total fire resistant composition.

In embodiments, the fire resistant composition contains wollastonite. The wollastonite may be present in an amount of about 1 wt % to about 20 wt %, or about 2 wt % to about 18 wt %, or about 5 wt % to about 16 wt %, or about 10 wt % to about 15 wt %, or about 11 wt %, or about 12 wt %, or about 13 wt %, or about 14 wt %. Wollastonite is a fire resistant, spiked sphere-like structure that promotes binding and strength within the fire resistant compositions.

The fire resistant composition further contains a fire resistant material. The fire resistant material can include, but is not limited to, a boron component such as boron oxide, boric acid, borax, sodium tetraborate decahydrate, zinc borate and/or a borosilicate, a silica component (e.g., a silica aerogel) a phosphate component such as a polyphosphate, melamine phosphate and ethylenediamine phosphate, and salts of any of the foregoing and derivatives of any of the foregoing. In at least one embodiment, the fire resistant material comprises zinc borate. Zinc borate may be composed of about 45% ZnO and about 34% boric anhydride ($B_2O_3$), with about 20% water of hydration. In addition, zinc borate is used as a fungicide. The zinc borate can be in the form of a powder, for example a fine powder, having a particle size distribution of less than about 10 μm, or less than about 5 μm, or less than about 4.3 μm, or less than about 2 μm, or less than about 1 μm, or less than about 0.8 μm, or less than about 0.5 μm. Zinc borate is a fire resistant material that has antifungal properties. Zinc borate also may be antibacterial (as shown in some studies) and antiviral. Zinc and boron minerals are already in the human body, so exposure may promote health. Unlike other fireproof materials, zinc borate non-toxic and non-carcinogenic.

In at least one embodiment, the fire resistant material is boron oxide. The boron oxide can be in the form of a powder, for example a fine powder, having a particle size distribution of less than about 10 μm, or less than about 5 μm, or less than about 2 μm, or less than about 1 μm, or less than about 0.8 μm, or less than about 0.5 μm. In embodiments, the fire resistant material is in an amount of about 0.1 wt % to about 5 wt %, or about 0.5 wt % to about 2.5 wt %, or about 1.0 wt % to about 2.0 wt %, or about 0.5 wt %, or about 0.6 wt %, or about 0.7 wt %, or about 1.0 wt %, or about 1.5 wt %, or about 1.6 wt %, or about 1.7 wt %, or about 1.8 wt %, or about 1.9 wt % of the total weight (e.g., the total dry weight) of the fire resistant composition. In embodiments, the fire resistant material may be present in an amount of about 0.1 wt % to about 10 wt %, or about 0.5 wt % to about 9.0 wt %, or about 1.0 wt % to about 8.0 wt %, or about 0.5 wt %, or about 3.0 wt %, or about 3.5 wt %, or about 3.9 wt %, or about 4.0 wt %, or about 5.0 wt %, or about 6.0 wt %, or about 7.0 wt %, or about 8.0 wt % of the total weight of the fire resistant composition.

In certain embodiments, the fire resistant composition can contain a binder. The binder can include at least one of cement, concrete, mortar, stucco, grout, plaster, mud, lime or alpha-calcium sulfate hemihydrate. Those of ordinary skill in the art will recognize that certain additives, fillers and fire resistant materials may also be suitable binders. In at least one embodiment, the binder is cement, for example, Portland cement. The binder can be in an amount of about 10 wt % to about 50 wt %, or about 15 wt % to about 45 wt %, or about 20 wt % to about 40 wt %, or about 25 wt % to about 35 wt %, or about 10 wt %, or about 12 wt %, or about 13 wt %, or about 14 wt %, or about 15 wt %, or about 36 wt %, or about 37 wt %, or about 38 wt %, or about 39 wt %, or about 40 wt %, or about 41 wt % of the total fire resistant composition. In embodiments, the binder is in an amount of about 10 wt % to about 50 wt %, or about 15 wt % to about 45 wt %, or about 20 wt % to about 40 wt %, or about 25 wt % to about 35 wt %, or about 36 wt %, or about 37 wt %, or about 38 wt % of the total weight of the fire resistant composition.

In embodiments, the fire resistant composition comprises lime in an amount of about 1 wt % to about 20 wt %, or about 2 wt % to about 18 wt %, or about 5 wt % to about 16 wt %, or about 10 wt % to about 15 wt %, or about 11 wt %, or about 12 wt %, or about 13 wt %, or about 14 wt %. Lime can assist with binding, not only to product itself but the material to which it attaches (e.g., steel beams, wood beams, plywood, drywall, concrete, bricks, glass, etc.).

In embodiments, the fire resistant composition contains Portland cement, which is fire resistant and helps with binding and density. The Portland cement may also produce breathability, which helps with mold and air pollution indoors.

In at least one embodiment, the fire resistant composition contains a homogenous dry mixture of an additive containing at least one of perlite, a polymer and a silicone, a filler containing at least one of polypropylene fiber and basalt microfiber or a fire resistant material containing boron oxide. The accelerator can be in liquid form and can include at least one of sodium metasilicate (e.g., formed by fusing sodium carbonate with silica sand at about 1400° C.), sodium silicate or a high performance accelerator for dry-mix sprayed concrete. According to embodiments, the accelerator can have a pouring density of about 0.1 kg/L to about 5 kg/L, or about 0.2 kg/L to about 2 kg/L, or about 0.5 kg/L to about 1 kg/L, or about 0.8 kg/L, or about 0.9 kg/L, or about 1 kg/L, or about 2 kg/L, a pH value of about 9 to about 13, or about 10 to about 12, or about 11 and a chloride content of less than about 0.5%, or less than about 0.2%, or less than about 0.1%, or less than about 0.05%. In embodiments, the accelerator can be MasterRoc® SA 580 manufactured by BASF®. The accelerator can be in liquid form, while the remainder of the fire resistant composition is a dry powder mixture. The perlite can be in an amount of about 31 wt %, the polymer in an amount of 0.60 wt %, the silicone in an amount of about 0.60 wt %, the accelerator in an amount of about 99 wt %, the polypropylene fiber and basalt microfiber in an amount of about 0.30 wt % and the boron oxide in an amount of about 0.02 wt % based on a total dry weight of the fire resistant composition. The accelerator can include sodium metasilicate in an amount of about 6 wt %, sodium silicate in an amount of about 60 wt % and high performance accelerator for dry-mix sprayed concrete in an amount of about 1.2 wt %.

In at least one embodiment, the fire resistant composition contains a homogenous dry mixture of an additive containing at least one of perlite, a polymer, calcite, cellulose, a filler containing at least one of polypropylene fiber and basalt microfiber, or a fire resistant material containing boron oxide. The cellulose can be microcrystalline cellulose (e.g., a refined wood pulp), for example, in the form of a powder. The microcrystalline cellulose can be inert, resistant to degradation in an acidic environment and may have no appreciable absorption. In large quantities, microcrystalline cellulose can form a bulk material.

In yet further embodiments, a fire resistant composition can include a binder as disclosed above, an additive as disclosed above, a surfactant as disclosed above and a fire resistant material as disclosed above. In at least one embodiment, the additive includes perlite in powder form having a particle size distribution of less than about 5 mm, or less than about 4 mm, or less than about 3 mm, or less than about 2 mm. In embodiments, the additive further includes calcium carbonate in powder form having a particle size distribution of less than about 500 μm, or less than about 400 μm, or less than about 300 μm, or less than about 200 μm, or less than about 100 μm. According to embodiments, the additive can include a polymer, for example, a silicone, acrylic, styrene-acrylic, styrene-acrylic vinyl acetate, polyvinyl acetate, ethylene-vinyl acetate, co-polymers thereof, dispersions thereof and admixtures thereof. Suitable acrylic polymers include, but are not limited to, methacrylic acid and acrylic acid monomers, or co-polymers of methacrylic acid and acrylic acid. In embodiments, the additive can comprise an ethylene oxide-polyethylene oxide copolymer, for example, Genapol PF 80 sold by Clariant, and may have a molecular weight of about 1,000 g/mol to about 15,000 g/mol, or about 2,000 g/mol to about 12,000 g/mol, or about 5,000 g/mol to about 10,000 g/mol, or about 8,000 g/mol to about 10,000 g/mol, or about 7,000 g/mol, or about 8,000 g/mol, or about 9,000 g/mol, or about 10,000 g/mol. The additive may further include a cellulosic material, for example, a starch ether, pectin, cellulose, lignin, hemicellulose, plant fiber, wood fiber, cotton fiber, hemp fiber and microcrystalline cellulose (e.g., a refined wood pulp), for example, in the form of a powder. The microcrystalline cellulose can be inert, resistant to degradation in an acidic environment and may have no appreciable absorption. In large quantities, microcrystalline cellulose can form a bulk material. Suitable starch ethers include, but are not limited to, potato starch ether and modified starch ether products such as Casucol®, Opagel®, Addilose®, Solvitose®, Foxcrete® and Colle®. Additionally, the additive can include an accelerator, for example, calcium chloride, calcium nitrate, calcium sulfate, sodium chloride, sodium silicate (e.g., formed by fusing sodium carbonate with silica sand at about 1400° C.) and anhydrous sodium metasilicate. According to at least one embodiment, the accelerator contains calcium chloride. In embodiments, the additive may include a high performance accelerator, for example MasterRoc SA 580, for use in dry mix sprayed concrete, an air entraining concrete admixture, for example SikaAer® Air Entraining Concrete Admixture and a silicone hydrophobic power, for example GP SHP 50 sold by Dow Corning®.

In embodiments, the fire resistant composition can further include a filler. Suitable fillers include, but are not limited to, a ceramic (e.g., ceramic fiber), silica, glass (e.g., glass fiber, recycled glass spheres), polypropylene fiber, titanium dioxide, potassium titanate, zinc oxide, zinc sulfite, antimony oxide, iron oxide, iron phosphate, fiberglass, mica, talc, aluminum trihydrate, antimony trioxide, zinc borate, wollastonite, dolomite and combinations thereof. In embodiments, the filler includes at least one of polypropylene fiber or silica.

The fire resistant composition may be a homogenous mixture (e.g., a dry mixture) of the binder, additive, surfactant and fire resistant material and optionally the filler. In embodiments, the fire resistant composition is a dry mixture that can be combined with water. According to embodiments, the binder is in an amount of about 10 wt % to about 50 wt %, or about 15 wt % to about 45 wt %, or about 20 wt % to about 40 wt %, or about 25 wt % to about 35 wt %, or about 36 wt %, or about 37 wt %, or about 38 wt % of the total dry mixture. The additive can be in an amount of about 30 wt % to about 90 wt %, or about 35 wt % to about 85 wt %, or about 40 wt % to about 80 wt %, or about 45 wt % to about 75 wt %, or about 50 wt % to about 70 wt %, or about 55 wt % to about 65 wt %, or about 56 wt %, or about 57 wt %, or about 58 wt %, or about 59 wt %, or about 60 wt %, or about 61 wt % of the total dry mixture. The fire resistant material can be in an amount of about 0.1 wt % to about 5 wt %, or about 0.5 wt % to about 2.5 wt %, or about 1.0 wt % to about 2.0 wt %, or about 1.5 wt %, or about 1.6 wt %, or about 1.7 wt %, or about 1.8 wt %, or about 1.9 wt % of the total dry mixture. The surfactant can be in an amount of about 0.1 wt % to about 5 wt %, or about 0.5 wt % to about 2.5 wt %, or about 1.0 wt % to about 2.0 wt %, or about 1.5 wt %, or about 1.6 wt %, or about 1.7 wt %, or about 1.8 wt %, or about 1.9 wt % of the total dry mixture. The filler can be in an amount of about 0.01 wt % to about 0.5 wt %, or about 0.05 wt % to about 0.4 wt %, or about 0.1 wt % to about 0.35 wt %, or about 0.31 wt %, or about 0.32 wt %, or about 0.33 wt %, or about 0.34 wt %, or about 0.35 wt % of the total dry mixture.

In at least one embodiment, the fire resistant composition includes a homogenous dry mixture of a binder comprising Portland cement, an additive containing at least one of perlite, a polymer, calcium carbonate, cellulose, starch ether, a silicone or an accelerator, a surfactant comprising at least one of alpha olefin sulfate, sodium salt or a co-polymer of propylene oxide and ethylene oxide, a fire resistant material containing boron oxide and a filler containing polypropylene fiber and silica. The perlite can be in an amount of about 0.32 wt %, the polymer in an amount of 0.01 wt %, the calcium carbonate in an amount of about 0.23 wt %, the cellulose in an amount of about 0.01 wt %, the starch ether in an amount of about 0.01 wt %, the silicone in an amount of about 0.01 wt %, the accelerator in an amount of about 0.01 wt %, the Portland cement in an amount of about 0.36 wt %, the polypropylene fiber in an amount of about 0.001 wt %, the silica in an amount of about 0.002 wt %, the boron oxide in an amount of about 0.02 wt %, the alpha olefin sulfate, sodium salt in an amount of about 0.005 wt % and the co-polymer of propylene oxide and ethylene oxide in an amount of about 0.01 wt %.

According to embodiments, the fire resistant composition comprises a dry mixture of the binder comprising at least one of Portland cement or lime; the additive comprising at least one of perlite or meta kaolin; the filler comprising at least one of wollastonite, basalt fiber or sodium alpha olefin sulfonate; and the fire resistant material comprising zinc borate. Tthe perlite may comprise modified expanded perlite in an amount of about 20 wt % to about 30 wt % of the total composition, the Portland cement may be in an amount of about 25 wt % to about 45 wt % of the total composition, the lime may be in an amount of about 10 wt % to about 20 wt % of the total composition, the wollastonite may be in an amount of about 1 wt % to about 15 wt % of the total composition, the meta kaolin may be in an amount of about 1 wt % to about 5 wt % of the total composition, the basalt fiber may be in an amount of about 0.1 wt % to about 1.0 wt % of the total composition, the sodium alpha olefin sulfonate may be in an amount of about 0.1 wt % to about 1 wt % of the total composition and the zinc borate may be in an amount of about 1 wt % to about 10 wt % of the total composition.

In embodiments, the fire resistant composition comprises at least one of perlite, a concrete waterproofing additive or sodium silicate as additive, wollastonite as filler, and zinc borate as fire resistant material. This mixture of dry material may be combined with water. The subsequent mixture may be suitable for spray coating and troweling. In embodiments, the perlite comprises modified expanded perlite in an amount of about 20 wt % to about 30 wt % of the total composition and modified expanded perlite powder in an amount of about 0.5 wt % to about 5.0 wt % of the total composition, the wollastonite is in an amount of about 1 wt % to about 7 wt % of the total composition, the concrete waterproofing additive is in an amount of about 0.1 wt % to about 5.0 wt % of the total composition, the sodium silicate is in an amount of about 18 wt % to about 30 wt % of the total composition, the zinc borate is in an amount of about 1 wt % to about 10 wt % of the total composition and the water is in an amount of about 35 wt % to about 50 wt % of the total composition.

Fire resistant compositions according to embodiments herein may have favorable heat conductivity properties. For example, the heat conductivity of the compositions may be about $0.01\lambda$ to about $1.0\lambda$, or about $0.02\lambda$ to about $0.09\lambda$, or about $0.04\lambda$ to about $0.08\lambda$, or about $0.049\lambda$ to about $0.051\lambda$.

Also disclosed herein are fire resistant articles formed from fire resistant compositions as described above. The articles can include, but are not limited to, a board, insulation, a sheet, a block and a panel. According to embodiments, the article is a square board or sheet having a length and width of about 30 cm and a thickness of about 4 cm. Articles according to embodiments herein may have a bulk density of about 500 kg/m$^3$ to about 8,000 kg/m$^3$, or about 1,000 kg/m$^3$ to about 4,000 kg/m$^3$, or about 1,500 kg/m$^3$ to about 2,000 kg/m$^3$. Articles may have a porosity of about 5% to about 75%. Articles according to embodiments herein may have a lifetime of about 10 years to about 500 years, or about 20 years to about 250 years, or about 50 years to about 100 years. In embodiments, articles as described herein may have a specific gravity of about 0.1 to about 1.0. In embodiments, articles as described herein may have a modulus of elasticity of about 1.0 Gpa to about 15 Gpa and a modulus of rupture of about 10 MPa to about 500 MPa.

Methods of Preparing the Fire Resistant Compositions and Articles

Also described herein are methods of preparing fire resistant compositions or articles formed from a fire resistant composition. In one embodiment, the method of preparing the fire resistant composition and/or article includes combining an additive as described above, a filler as described above and a fire resistant material as described above to form a combination. Certain components of the composition may be in a dry powder form, while other components, for example, the accelerator, are in liquid form. Accordingly, the dry components may be combined with the liquid components to form the combination. A mass per volume (kg/L) ratio of the dry components to the wet components may be about 1:100 to about 100:1, or about 1:99 to about 99:1, or about 1:95 to about 95:1. The combination may be a viscous liquid, a slurry or a paste.

In embodiments, the additive contains at least one of perlite, a polymer as described above or an accelerator as described above. The fire resistant material can include boron oxide and the filler can include polypropylene fiber and basalt microfiber.

In embodiments, the combination can further include a binder as described above. Additionally, the combination may contain a surfactant (as described above).

The combination can be compressed into an article. For example, the combination may be poured into a mold. The compression tool may then apply a force of about 25 N to about 250 N, or about 50 N to about 200 N, or about 75 N to about 100 N to the combination for a period of about 1 sec to about 1 hour, or about 5 sec to about 45 min, or about 30 sec to about 30 min, or about 1 min to about 15 min to form the article. Suitable articles include, but are not limited to, boards, insulation, sheeting, panels, ceiling panels, siding, blocks and other building components and materials. After forming the article, it can be heated (or cured) by a heat source for about 10 minutes to about 3 hours, or about 15 minutes to about 2 hours, or about 20 minutes to about 1 hour at a temperature of about 100° C. to about 200° C., or about 110° C. to about 190° C., or about 120° C. to about 180° C., or about 130° C. to about 170° C., or about 140° C. to about 160° C., or about 150° C., or about 200° C. Suitable heat sources include, but are not limited to, ovens, kilns and microwave ovens.

The heated article may be subsequently heated again for about 10 minutes to about 4 hours, or about 15 minutes to about 3 hours, or about 20 minutes to about 2 hours at a temperature of about 200° C. to about 600° C., or about 250° C. to about 550° C., or about 300° C. to about 500° C., or about 350° C. to about 450° C., or about 300° C., or about 350° C., or about 425° C., or about 450° C., or about 475° C. The same heat source may be used, or different heat sources can be used to subsequently heat the article.

In some embodiments, the method of preparing the article may further include spraying an additive onto the article following the second heating step. The additive is sprayed onto the article once all of the heating is completed. The additive may be any one or more of the additives as described above.

According to one or more embodiments, also disclosed herein is a method of preparing a fire resistant composition and/or article including combining a binder (as described above), an additive (as described above), a surfactant (as described above) and a fire resistant material (as described above) to form a combination. The combination can be a homogenous mixture (e.g., a dry powder). In embodiments, the binder is Portland cement, the additive includes at least one of perlite, a polymer, calcium carbonate, cellulose, starch ether, a silicone or an accelerator, the surfactant includes at least one of alpha olefin sulfate, sodium salt or a co-polymer of propylene oxide and ethylene oxide, and the fire resistant material is boron oxide. The combination may also include a filler containing polypropylene fiber and silica.

The combination may be packaged as a dry powder and stored in a bag until the time and point of use. The entire dry contents are mixed with water to form a slurry. A mass per volume (kg/L) ratio of the combination to the water can be about 1:10 to about 10:1, or about 1:5 to about 5:1, or about 1:2 to about 2:1, or about 1:1, or about 1.1:1, or about 1.5:1. The slurry can be compressed into an article and/or spread or sprayed onto one or more surface of the article.

Methods of Using the Fire Resistant Compositions and Articles

Also described herein are methods of using the fire resistant compositions and articles as described herein. The methods can include using the fire resistant compositions to form articles including, but not limited to, boards, insulation, sheeting, panels, blocks and other building components. Further methods can include installing and/or coating such fire resistant articles in or on a building, airplane, space craft, automobile, industrial oven, on electrical components.

In embodiments, fire resistant compositions as described herein may be in the form of a fire resistant powder. All the dry ingredients may be mixed with and placed in 50 lb bags. At a construction site, the dry mixture can be combined with 20 liters of clean water using an industrial mixer and then troweled or sprayed onto building materials.

In embodiments, the fire resistant compositions may be mixed and formed into building materials such as boards. For example, all of the dry components may be mixed together using an industrial mixer for about 20 minutes and subsequently combined with a mixture of the sodium silicate and clean water (20 liters) and for another 5 minutes. The ingredients may then be poured into molds. The material may then be cured in the molds for about 48 hours, 24 hours at 90° F. and 24 hours at 80° F.

EXAMPLES

Example 1—Fire Resistant Powder

A fire resistant powder was prepared. The composition was formulated having the ingredients set forth in Table 1. The modified expanded perlite and the modified expanded perlite powder were in the form of a coated spray mix. All the dry ingredients were mixed with and placed in 50 lb bags so that at a construction site, the dry mixture can be combined with 20 liters of clean water using an industrial mixer and then troweled or sprayed.

TABLE 1

Board Composition

| Ingredient | Amount (g) | wt % |
| --- | --- | --- |
| Portland Cement | 1500 | 39.20 |
| Modified Expanded Perlite | 1000 | 26.13 |
| Lime | 500 | 13.07 |
| Wollastonite | 500 | 13.07 |
| Meta Kaolin | 150 | 3.92 |
| Basalt Fiber | 8 | 0.21 |

TABLE 1-continued

Board Composition

| Ingredient | Amount (g) | wt % |
|---|---|---|
| Zinc Borate | 150 | 3.92 |
| Sodium alpha olefin sulfonate | 19 | 0.50 |

Example 2—Fire Resistant Board

A fire resistant composition was prepared and formed into a board for use as a building material. The composition was formulated having the ingredients set forth in Table 1. The modified expanded perlite and the modified expanded perlite powder were in the form of a coated spray mix. All of the dry components were mixed together with an industrial mixer for about 20 minutes and subsequently combined with a mixture of the sodium silicate and clean water (20 liters) and for another 5 minutes. The ingredients were poured into molds. The material was cured in the molds for about 48 hours, 24 hours at 90° F. and 24 hours at 80° F.

TABLE 2

Board Composition

| Ingredient | Amount (g) | wt % |
|---|---|---|
| Modified Expanded Perlite | 650 | 22.77 |
| Modified Expanded Perlite Powder | 50 | 1.75 |
| Wollastonite (Wolkem ® Kemolit ® kw 60) | 125 | 4.38 |
| Concrete Waterproofing Additive (Xypex ® Admix C 1000 NF) | 30 | 1.05 |
| Zinc Borate | 200 | 7.01 |
| Water | 1200 | 42.03 |
| Sodium Silicate 3.2 module (liquid) | 600 | 21.02 |
| total | 2855 | 100.00 |

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail in order to avoid unnecessarily obscuring the present invention. Thus, the specific details set forth are exemplary. Particular embodiments may vary from these exemplary details and still be contemplated to be within the scope of the present invention.

Although the operations of the methods herein are described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A fire resistant composition, comprising:
an additive comprising modified expanded perlite in an amount of about 20 wt % to about 30 wt % of the total composition, meta kaolin in an amount of about 1 wt % to about 5 wt % of the total composition, or a combination of thereof;
a filler comprising wollastonite in an amount of about 1 wt % to about 15 wt % of the total composition, basalt fiber in an amount of about 0.1 wt % to about 1.0 wt % of the total composition, sodium alpha olefin sulfonate in an amount of about 0.1 wt % to about 1 wt % of the total composition, or a combination of any two or more thereof;
a fire resistant material comprising zinc borate in an amount of about 1 wt % to about 10 wt % of the total composition; and
a binder comprising a dry mixture comprising Portland cement in an amount of about 25 wt % to about 45 wt % of the total composition, lime in an amount of about 10 wt % to about 20 wt % of the total composition, or a combination thereof.

2. The fire resistant composition of claim 1, wherein the additive further comprises a pozzolanic compound, modified expanded perlite powder, vermiculite, diatomite, smectite, illite, dickite, nacrite, hectorite, montmorillonite, bentonite, glauconite, clay, a concrete waterproofing additive, sodium silicate, shale, slag, fly ash, silica fume, pumice, calcium carbonate, calcium hydroxide, a cellulosic material, a polymer, an accelerator, or a combination of any two or more thereof.

3. The fire resistant composition of claim 1, comprising the modified expanded perlite, wherein the modified expanded perlite is a powder having a particle size of less than about 5 mm.

4. The fire resistant composition of claim 2, wherein the concrete waterproofing additive comprises fine silica, a polymer, a densifier, a water repellant, a pozzolanic material modified with at least one hydrophobic material, or a combination of any two or more thereof.

5. The fire resistant composition of claim 2, wherein the cellulosic material comprises a starch ether, pectin, cellulose, lignin, hemicellulose, plant fiber, wood fiber, cotton fiber, hemp fiber, or a combination of any two or more thereof.

6. The fire resistant composition of claim 2, wherein the accelerator comprises calcium chloride, calcium nitrate, calcium sulfate, sodium chloride, sodium silicate, sodium metasilicate, anhydrous sodium metasilicate, a high performance accelerator for dry-mix sprayed concrete, or a combination of any two or more thereof.

7. The fire resistant composition of claim 1, further comprising a surfactant, wherein the surfactant comprises alkylbenzene sulfonate, dodecyl benzene sulfonate, polyvinyl alcohol, polyethylene glycol, hydrocarbon oil, polydimethylsiloxane, fatty alcohol ethoxylate, fatty acid ester, co-polymer of propylene oxide and ethylene oxide, styrene-butadiene resin, salts of any of the foregoing, derivatives of any of the foregoing, or a combination of any two or more of the foregoing.

8. The fire resistant composition of claim 1, wherein the fire resistant material further comprises boron oxide, boric acid, borax, sodium tetraborate decahydrate, a borosilicate, a phosphate, a polyphosphate, melamine phosphate, ethylenediamine phosphate, salts of any of the foregoing, derivatives of any of the foregoing, or a combination of any two or more of the foregoing.

9. The fire resistant composition of claim 1, wherein the filler further comprises a ceramic, silica, glass, polypropylene fiber, titanium dioxide, potassium titanate, zinc oxide, zinc sulfite, antimony oxide, iron oxide, iron phosphate, fiberglass, mica, talc, aluminum trihydrate, antimony trioxide, dolomite, or a combination of any two or more thereof.

10. The fire resistant composition of claim 1, wherein the fire resistant composition is a homogenous mixture of the additive, filler and fire resistant material.

11. The fire resistant composition of claim 1, wherein the additive further comprises an accelerator comprising sodium meta silicate, sodium silicate, a high performance accelerator for dry-mix spray in liquid form, or a combination of any two or more thereof.

12. A fire resistant composition, comprising:
an additive comprising modified expanded perlite in an amount of about 20 wt % to about 30 wt % of the total composition, modified expanded perlite powder in an amount of about 0.5 wt % to about 5.0 wt % of the total composition, a concrete waterproofing additive in an amount of about 0.1 wt % to about 5.0 wt % of the total composition, sodium silicate in an amount of about 18 wt % to about 30 wt % of the total composition, or a combination of any two or more thereof;
a filler comprising wollastonite in an amount of about 1 wt % to about 7 wt % of the total composition; and
a fire resistant material comprising zinc borate in an amount of about 1 wt % to about 10 wt % of the total composition; and
water in an amount of about 35 wt % to about 50 wt % of the total composition.

13. The fire resistant composition of claim 12, wherein the additive further comprises a pozzolanic compound, vermiculite, diatomite, smectite, illite, dickite, nacrite, hectorite, montmorillonite, bentonite, glauconite, clay, sodium alpha olefin sulfonate, a concrete waterproofing additive, sodium silicate, shale, slag, fly ash, silica fume, pumice, calcium carbonate, calcium hydroxide, a cellulosic material, a polymer, an accelerator, or a combination of any two or more thereof.

14. The fire resistant composition of claim 13, wherein the concrete waterproofing additive comprises fine silica, a polymer, a densifier, a water repellant, a pozzolanic material modified with at least one hydrophobic material, or a combination of any two or more thereof.

15. The fire resistant composition of claim 13, wherein the cellulosic material comprises a starch ether, pectin, cellulose, lignin, hemicellulose, plant fiber, wood fiber, cotton fiber, hemp fiber, or a combination of any two or more thereof.

16. The fire resistant composition of claim 13, wherein the accelerator comprises calcium chloride, calcium nitrate, calcium sulfate, sodium chloride, sodium silicate, sodium metasilicate, anhydrous sodium metasilicate, a high performance accelerator for dry-mix sprayed concrete, or combinations of any two or more thereof.

17. The fire resistant composition of claim 12, further comprising a surfactant, wherein the surfactant comprises an alpha olefin sulfonate, alkylbenzene sulfonate, dodecyl benzene sulfonate, polyvinyl alcohol, polyethylene glycol, hydrocarbon oil, polydimethylsiloxane, fatty alcohol ethoxylate, fatty acid ester, co-polymer of propylene oxide and ethylene oxide, styrene-butadiene resin, salts of any of the foregoing, derivatives of any of the foregoing, or a combination of any two or more of the foregoing.

18. The fire resistant composition of claim 12, wherein the fire resistant material further comprises boron oxide, boric acid, borax, sodium tetraborate decahydrate, a borosilicate, a phosphate, a polyphosphate, melamine phosphate, ethylenediamine phosphate, salts of any of the foregoing, derivatives of any of the foregoing, or a combination of any two or more thereof.

19. The fire resistant composition of claim 12, wherein the filler further comprises a ceramic, silica, glass, polypropylene fiber, titanium dioxide, potassium titanate, zinc oxide, zinc sulfite, antimony oxide, iron oxide, iron phosphate, fiberglass, mica, talc, aluminum trihydrate, antimony trioxide, dolomite, or a combination of any two or more thereof.

20. The fire resistant composition of claim 12, wherein the fire resistant composition is a homogenous mixture.

21. The fire resistant composition of claim 12, wherein the additive further comprises an accelerator comprising sodium meta silicate, a high performance accelerator for dry-mix spray in liquid form, or combinations of any two or more thereof.

* * * * *